April 25, 1944.  J. J. SHIVELY ET AL  2,347,514
CONTROL METHOD AND APPARATUS
Filed Jan. 17, 1941  4 Sheets-Sheet 1

INVENTORS:
John J. Shively
Harry R. Van Deventer
BY
Van Deventer & Grier
ATTORNEYS.

April 25, 1944.  J. J. SHIVELY ET AL  2,347,514
CONTROL METHOD AND APPARATUS
Filed Jan. 17, 1941  4 Sheets-Sheet 2

INVENTORS:
John J. Shively
Harry R. VanDeventer
BY
VanDeventer & Grier
ATTORNEYS.

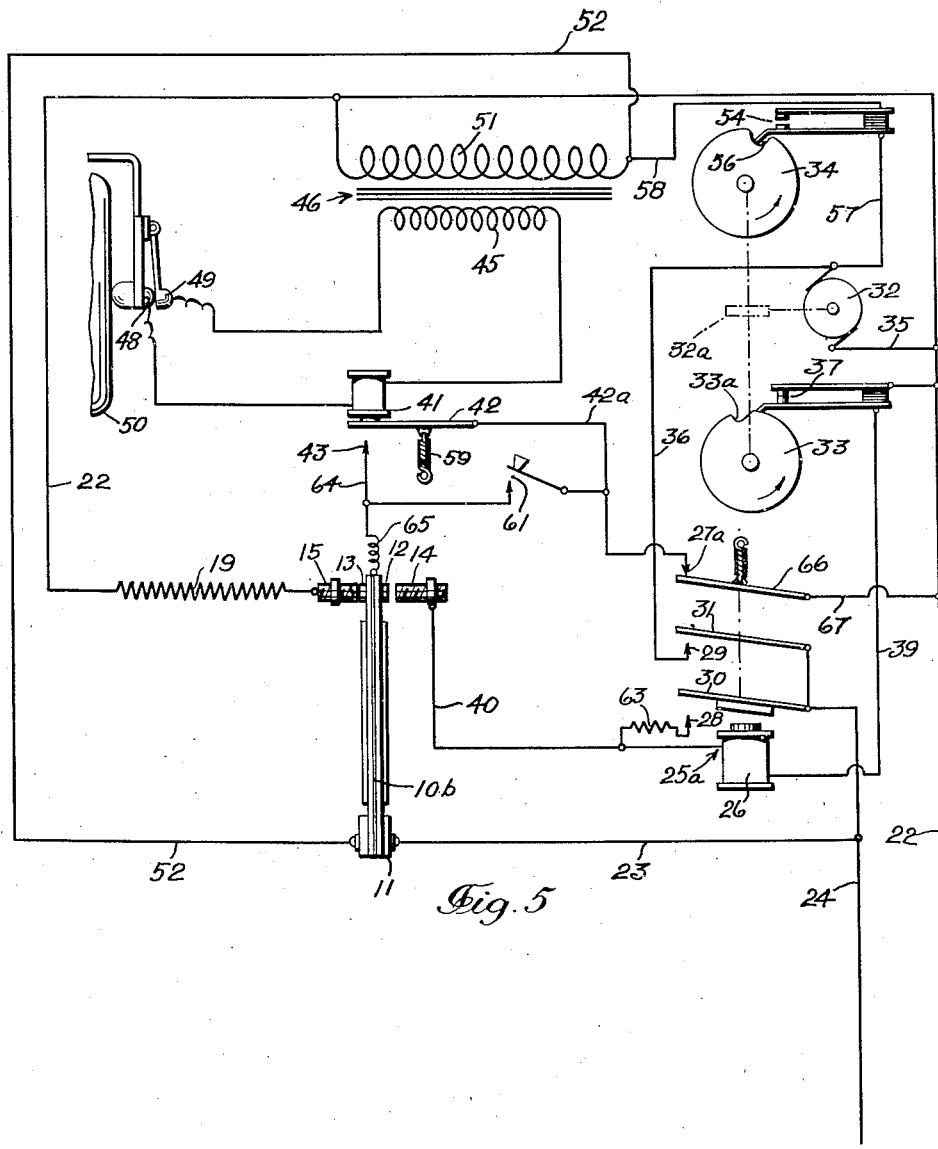

Patented Apr. 25, 1944

2,347,514

UNITED STATES PATENT OFFICE 2,347,514

CONTROL METHOD AND APPARATUS

John J. Shively and Harry R. Van Deventer, New York, N. Y., assignors, by mesne assignments, to Telephone Answering and Recording Corporation, New York, N. Y., a corporation of Delaware Application January 17, 1941, Serial No. 374,808

15 Claims. (Cl. 175—320)

The present invention pertains to improvements in Control methods and apparatus, being a continuation in part of application Serial Number 333,268 filed May 4, 1940, now Patent No. 2,261,420, dated November 4, 1941.

In the above patent application is shown and described a telephone answering and recording device having a starting circuit operable in response to vibratory interruptions of a normally closed detector circuit.

An object of the present invention is to provide methods and apparatus for the above and similar purposes in which stabilizing means are included to prevent possible variations in operation under changing conditions of ambient temperature.

Another object is to provide a thermal delay relay responsive cumulatively to current input to control a circuit, the thermostat by the disclosed method being pre-heated and normally maintained at a pre-determined temperature by auxiliary current input controlled by the thermostat itself.

Further objects and advantages of the invention will become evident during the course of the following description, in connection with the accompanying drawings, in which—

Figure 5 shows another alternative arrangement.

Figure 1:
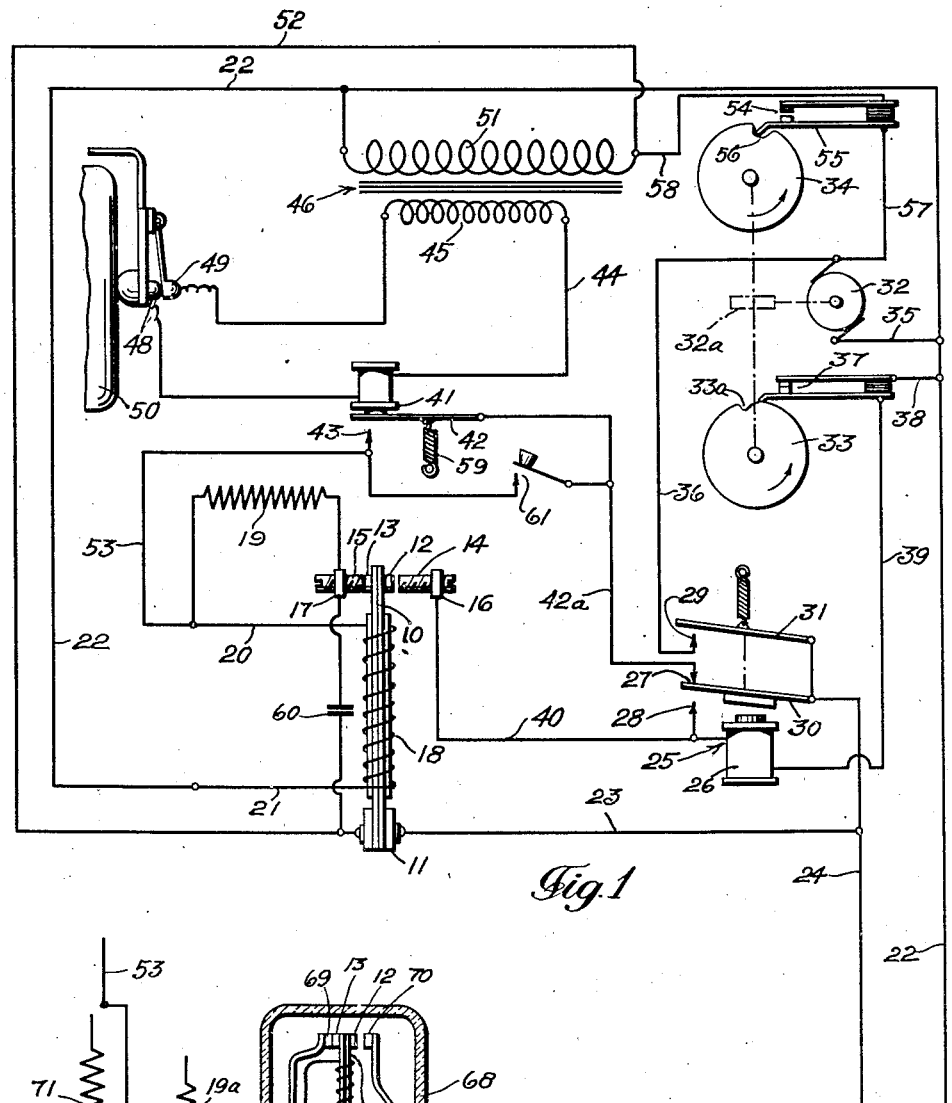
Figure 1 is a diagrammatic view of a preferred form of the invention.

Referring to Figure 1, the numeral 10 denotes a bimetallic strip held at one end in a stationary metallic support 11. The free end of the strip 10 carries front and back contact points 12 and 13 respectively adapted to engage stationary contact screws 14 and 15, the latter being adjustably held in fixed supports 16 and 17.

A heating coil or element 18 is adapted when energized to heat the bimetallic strip 10 and cause the latter to bend toward the right. While the oil 18 is shown diagrammatically as wound around the strip 10 and electrically insulated therefrom, it is obvious that if desired the heating element may be separately mounted closely adjacent the strip 10, the essential requirement being simply that the coil be so located that its heat may be readily conveyed to the bimetallic strip.

The adjustable back contact screw 15 is connected through a resistor 19 with one lead 20 of the coil 18. The opposite lead 21 of coil 18 is connected to one conductor 22 of a suitable source of current. The metallic support 11 of the bimetallic strip 10 is connected via a wire 23 to the second supply conductor 24.

In the general starting or control circuit illustrated, which is typical of the type suitable for use with cyclic devices such as the telephone message recorder set forth in the above-noted copending application Serial Number 333,268, the numeral 25 generally indicates a relay having a magnet 26, normally closed contact 27 and normally open contacts 28 and 29 cooperative with movable arms 30 and 31, the latter being connected to the supply conductor 24.

It will, of course, be evident that the relay 25 may have any desired number of contacts for controlling additional apparatus, only such parts being shown herein as are pertinent to the illustration of the present invention.

A motor 32, adapted to drive cyclic control cams 33 and 34 through any suitable speed reducing means 32ª, is connected on one side via a lead 35 to the supply conductor 22. The other side of motor 32 is connected via a wire 36 to the normally open relay contact 29.

A breaker 37 normally held closed by the cam 33, is connected by wires 38 and 39 between the relay magnet 26 and the supply lead 22. The other side of the magnet 26 is connected via a lead 40 to the front contact screw mounting 16. The lead 40 is also electrically joined to the normally open relay contact 28.

A detector relay 41 has a movable switch arm 42 adapted to be held clear of a contact point 43 when relay 41 is energized. The relay 41 is connected on one side via lead 44 to the low voltage secondary winding 45 of a transformer 46. A closed circuit through the secondary 45 and the relay 41 is normally maintained through a vibratory breaker, illustrated herein as having a stationary contact member 48 and a weighted movable contact member 49. The weighted member 49 normally rests lightly against the stationary member 48, thus maintaining the circuit through relay 41 as noted, but when mechanical vibration, as for example from a telephone bellbox 50, is transmitted through member 48, the weighted member 49 is "kicked" away from member 48, thus interrupting the circuit.

The primary winding 51 of the transformer 46 is connected on one side to the supply conductor 22 and on the other side via a wire 52, the support 11 and the lead 23 to the conductor 24.

The contact point 43 of relay 41 is connected via a lead 53 to the lead 20 of the heating coil 18, while the arm 42 has a connection through wire 42ª with the normally closed relay contact 27.

A second breaker 54 is cooperative with the cam 34, the lower arm 55 thereof normally resting in an elongated notch 56 in the cam periphery so as to hold the breaker open. Leads 57 and 58 connect the breaker 54 between the conductor 36 and the wire 52.

In operation, the back contact screw 15 is normally set to engage the back contact 13 when the temperature of the bimetallic strip 10 is slightly above the highest ambient temperature which can be encountered by the apparatus. Under these circumstances when contact is made, current flows from the supply conductor 24 through the wire 23, support 11, bimetallic strip 10, contact point 13, screw 15 and resistor 19 to the lead 20, thence through the heater coil 18 and lead 21 to the supply conductor 22. The passage of current through the coil 18 causes the latter to heat the bimetallic strip, which bends slightly to the right and moves the contact point 13 out of contact with the screw 15, breaking the above described circuit.

The circuit remains open until the bimetallic strip 10 cools slightly and bends to the left to restore the contact, again causing heating as described, whereupon the above action is repeated.

Due to the presence of the resistor 19, the stabilizing current supplied to the coil 18 as above described is of comparatively low value, being in the nature of a trickle current, so that the heating described is gradual with very little heat lag between the coil 18 and strip 10. The gaps successively produced between the point 13 and screw 15 are therefore very small, the total movement of the point 13 being only sufficient to barely make and break the trickle circuit.

In practice the resistance of resistor 19 is made such that the current flow is just sufficient to keep the strip 10 heated to the above described breaking point when the ambient temperature is at the lowest value to be encountered. If desired in some cases a suitable condenser 60 may be connected across the contact members 13 and 15 to reduce any sparking which may occur between them.

It will be seen from the above description that the effect of the stabilizing current is to normally hold the bimetallic strip 10 at a substantially constant temperature and initial position irrespective of ambient temperature changes.

When the coil 18 receives main operating current, the operation is as follows, the input impulses being illustrated herein as initiated by vibration of the telephone bell-box 50.

As previously noted, the relay 41 is normally energized by low voltage from the secondary 45 of transformer 46 and holds the switch arm 42 clear of the contact point 43 against the tension of a spring 59. When the bell-box 50 vibrates and the vibrations are transmitted to the contact members 48 and 49, the member 49 is kicked away from member 48, breaking the low voltage circuit and de-energizing the relay 41. The spring 59 snaps the arm 42 into contact with contact point 43. A circuit is thereby completed from supply conductor 24 through the main relay arm 30, contact 27, lead 42ª, arm 42, contact 43, wire 53, lead 20, heater coil 18 and lead 21 to the supply conductor 22, thus throwing full supply line voltage across the heater coil. The heating effect thereby produced bends the bimetallic strip 10 to the right away from the back contact. Successive impulses of current, for example due to successive vibrations of the telephone bell-box 50 as described, produce cumulative heating and bending of the strip 10 until the front contact point 12 engages the screw 14.

When contact occurs between point 12 and the screw 14 a circuit is completed from supply conductor 24 through the wire 23, the support 11, the strip 10, contact point 12, screw 14, lead 40, magnet 26, lead 39, normally closed breaker 37 and lead 38 to the supply conductor 22. The magnet 26 being energized closes the contacts 28 and 29 and opens the contact 27.

Closure of contact 29 directs current from supply conductor 24 through the arm 31, contact 29 and wire 36 to the motor 32, thence through lead 35 to the conductor 22, thus starting the motor 32 which drives the cams 33 and 34. At the same time the opening of the relay contact 27 breaks the previously described full line current supply circuit through the heater element 18, this circuit thereafter remaining open irrespective of any action of the relay 41 so long as the relay magnet 26 remains energized. Furthermore, due to the closure of relay contact 28, a holding circuit is set up through the magnet 26, lead 39, breaker 37 and lead 38 which holds the magnet 26 energized so long as the breaker 37 remains closed.

The motor 32, having been started as described, revolves the cams 33 and 34 as indicated by the arrows.

As the notch 56 in cam 34 moves through a few initial degrees of its rotation the breaker arm 55 is forced upward, closing the breaker 54. Thereby a second connection between supply conductors 22 and 24 through the motor 32 is established via leads 35 and 57, breaker 54, leads 58 and 52, support 11 and wire 23. It will be evident that the last-named connection through the motor 32 persists until the cam 34 completes its revolution and the notch 56 permits the breaker 54 to re-open as shown. Just prior to the opening of breaker 54, a notch 33ª in cam 33 permits a momentary opening of the breaker 37, thus deenergizing the holding circuit of relay magnet 26 and allowing the relay 25 to return to normal condition as shown.

During the cyclic rotation of the cams 33 and 34, the heater coil 18 is free of main operating current as previously noted, allowing the bimetallic element 10 to cool and bend to the left until the point 13 again engages the contact screw 15. Thereupon the trickle current operation is re-established to hold the member 10 substantially at constant temperature and position ready for the next input of main operating current to the heater 18.

The main heating current supplied to the coil 18, being much heavier than the stabilizing or trickle current, causes comparatively high heating and rapid bending of the bimetallic element 10, so that the gap between the point 12 and screw 14 for time delay operation is normally made comparatively large. In comparison to this gap the amplitude of movement between the back contact point 13 and screw 15 in making and breaking the trickle current is so small as to be practically negligible. The amount of additional rapid heating effect necessary to establish contact between point 12 and screw 14 for any normal adjustment of the screw 14 therefore remains substantially constant irrespective of ambient temperature changes within the range of the apparatus.

In a typical case of operating current impulses occurring in regular succession due to ringing vibrations of a telephone box 50, it is evident that the duration of time necessary for a ring or regular succession of rings to cause contact between point 12 and screw 14 may be set as desired by adjustment of the screw 14. Similarly, if it is desired to operate a starting circuit by any other means of main current input control to the coil 18, as for example by a manual key or switch 61, the time interval from closure of key 61 to the actuation of relay 25 is determined by the setting of screw 14 and is substantially independent of ambient temperature since the element 10 is held at substantially constant initial temperature and position by the trickle current as described.

Figure 3:
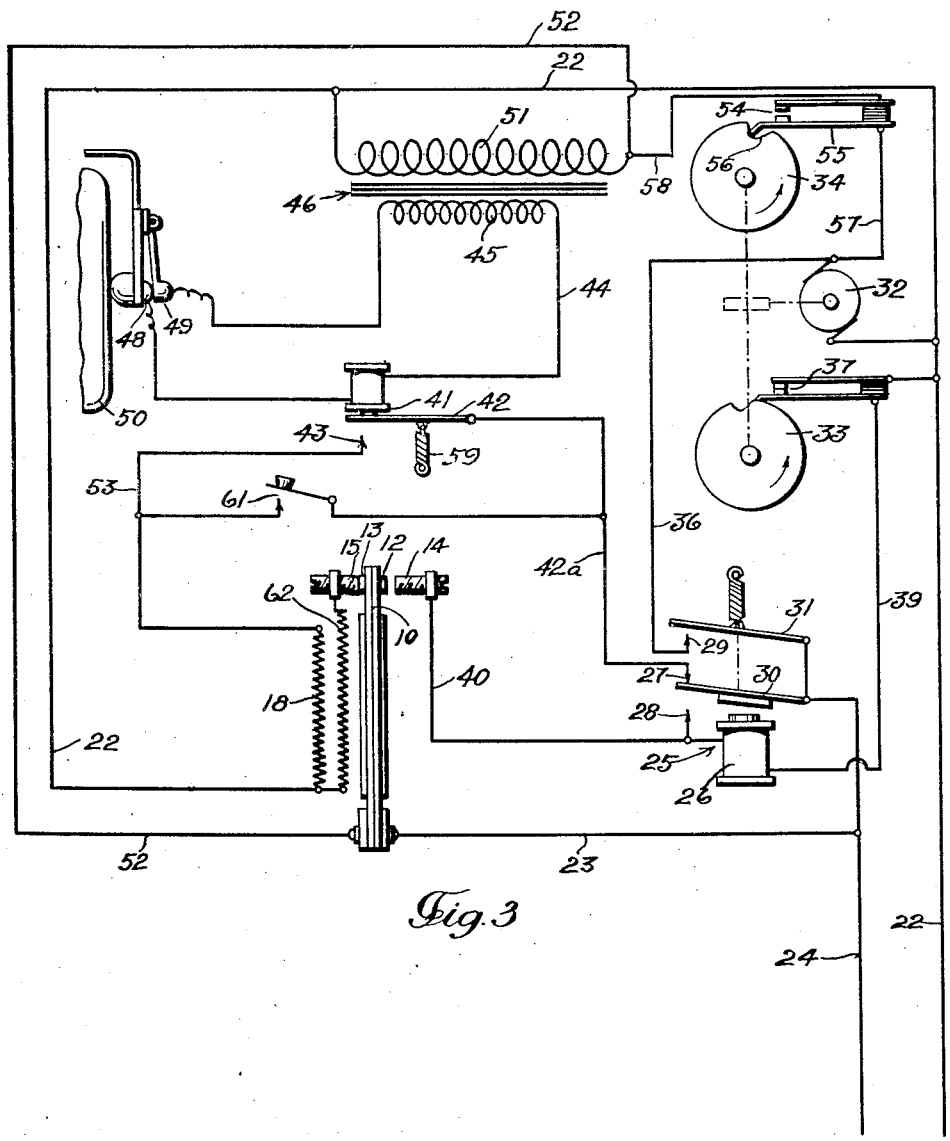
Figure 3 is a similar view showing an alternative arrangement of heater elements.

In Figure 3 the circuits and apparatus illustrated and the operation thereof are substantially the same as those of Figure 1, except that the trickle current, instead of being directed through the main heater coil 18, is directed through an auxiliary heating coil 62 on or closely adjacent the bimetallic member 10, and in this case the auxiliary heating coil 62 also serves the purpose of the resistor 19, Figure 1, in limiting the magnitude of the trickle current.

Figure 4:
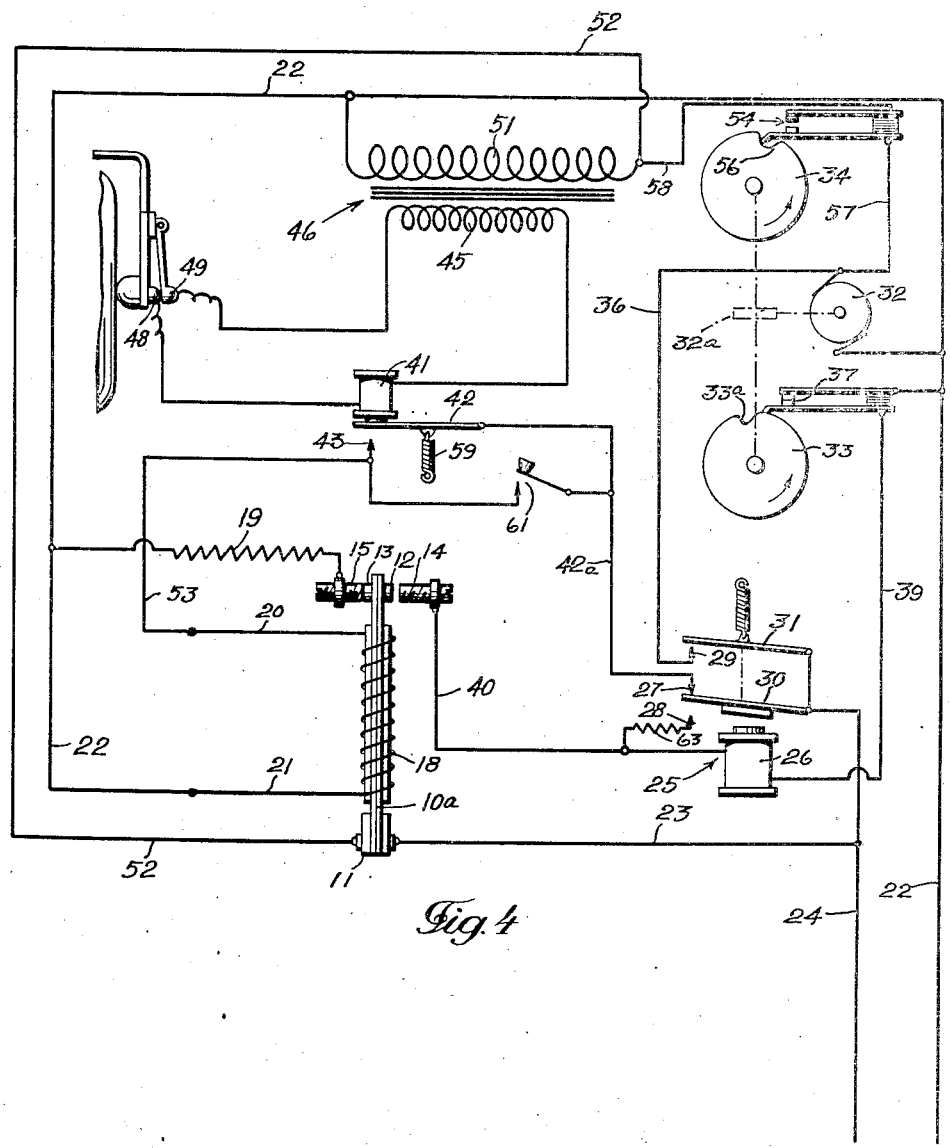
Figure 4 is a similar view showing a second alternative arrangement.

In Figure 4, the arrangement and operation are the same as those of Figure 1 except that the bimetallic element 10ª has sufficient resistance that the trickle current passing therethrough causes the necessary stabilizing heat to be produced in the element itself. In this case the back contact screw is connected to the line conductor 22 through the resistor 19, though if the resistance of element 10ª is sufficiently high the exterior resistor 19 may be omitted. In this embodiment the magnet 26 of the relay 25 is wound to operate on the reduced current due to the resistance of the bimetallic element 10ª in series, and a suitable resistor 63 is inserted in series with the contact 28 to similarly restrict the holding current.

In the embodiment shown in Figure 5, both the stabilizing or trickle heat and the main operating current are produced in the bimetallic element 10ᵇ without the use of any other heating element. The contact point 43 of detector relay 41 is connected through a lead 64 and a suitable flexible connector 65 with the free or movable end of the element 10ᵇ. The arm 42 of relay 41 is connected as before via its lead 42ª to normally closed contact point 27ª of main relay 25ª, but the point 27ª, instead of engaging arm 30, is provided with an independent arm 66 connected via a branch 67 with the supply conductor 22. The back contact screw is connected through the resistor 19 with the supply conductor 22.

Normally the trickle current flows from conductor 22 through the resistor 19, the contact screw 15, the back contact point 13, the thermostatic member 10ᵇ and the lead 23 to the supply conductor 24. Stabilizing heat is thereby produced in the element 10ᵇ as previously described. Closure of either relay 41 or manual switch 61 directs current from the conductor 22 via the lead 67, arm 66, contact point 27ª, lead 42ª and flexible connector 65 to the element 10ᵇ. By this means the resistor 19 and back contact screw 15 and point 13 are by-passed, full supply voltage being applied through the element 10ᵇ with consequent increased heating until the relay 25ª is energized as before.

The comparatively heavy operating current used in heating the thermostatic element produces heat therein so rapidly that any differences in heat loss during the operating period under varying exterior temperature conditions are normally too small to practically affect the time delay action. However, in special cases where such slight variations could become an appreciable factor, the device may be shielded in any suitable manner to reduce them. For example, a vacuum or gas-filled envelope 68 may be applied as illustrated diagrammatically in Figure 2.

Figure 2:
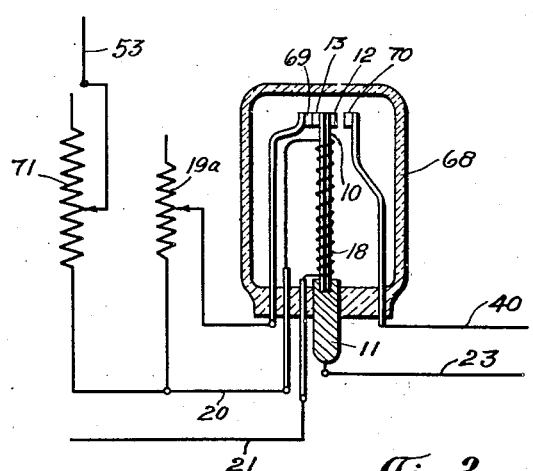
Figure 2 illustrates the enclosure of the thermostatic apparatus.

In Figure 2, the bimetallic element 10 and heater 18 are housed in the evacuated envelope 68. The points 13 and 14 are adapted to engage back and main or front contacts 69 and 70. To avoid adjustments within the sealed envelope, the points 69 and 70 are supported in fixed position, and adjustment of the main operating time is provided by inserting an exterior variable resistor 71 in series with the heater coil 18. If adjustment of the trickle current is desired, its exterior resistor 19ª may also be made variable, as shown. It will be understood that a suitable envelope may similarly be used with the forms of apparatus shown diagrammatically in Figures 1, 3, 4, and 5.

The thermostatic elements have been shown as substantially straight bimetallic strips, but it will be understood that these diagrammatic showings are illustrative, it being obvious that the thermostatic elements may be of any suitable shapes and types.

From the foregoing description it will be evident that the invention provides a method in which a thermostatic device of the character described is self-compensating or stabilizing against variation in normal operation under various exterior temperature conditions within its range, the stabilization or compensation being controlled by the main thermostatic element itself without the necessity for any auxiliary thermostatic members.

While the invention has been set forth in preferred manner, it is not limited to the exact forms and circuits illustrated, as various modifications in apparatus and method may be made without departing from the scope of the appended claims.

What is claimed is:

1. The method of operating a thermostatic device which includes first pre-heating the device to a desired temperature by means controlled by said device, secondly maintaining said device at said pre-heated temperature by the intermittent application of heat thereto under the control of said device, and thirdly, raising the temperature of said pre-heated device above said first temperature by the application of additional heat thereto.

2. The method of operating a thermostatic device which includes the step of pre-heating the device to a desired temperature by heating means controlled by said device, the second step of maintaining said temperature by said means during normal non-operating periods of the device, and the third step of raising the temperature of said pre-heated device above said first temperature by applying extra heat thereto to cause said device to operate.

3. The method of operating a thermostatic device to control a circuit which includes the steps of first pre-heating the device to a desired temperature, secondly normally maintaining said temperature under control of said device and, thirdly, raising the temperature of said device above said first temperature to actuate said device to control a circuit.

4. That method of stabilizing a control device including means adapted to be actuated by heat at a temperature above that of the surrounding exterior medium, which comprises normally applying heat to said means to normally maintain the same substantially at a pre-determined temperature at all times above said surrounding temperature but below said actuating temperature, and controlling said normal heat application by said means.

5. In a device of the character described, in combination, a thermostatic member operable by heat to control a circuit, means controllable by said thermostatic member to normally maintain said member substantially at a pre-determined temperature higher than the temperature of the surrounding media, and means to heat said member above said pre-determined temperature and that of the surrounding medium to operate said member and thereby control said circuit.

6. In a device of the character described, a thermostatic member, electric heating means adapted to supply heat to said member, means to direct operating current through said heating means to actuate said member, and means controllable by said member to normally direct a trickle current through said heating means whereby said member may normally be maintained substantially at a pre-determined temperature.

7. In a thermal delay device, in combination, a main contact member, an auxiliary contact member, a heat responsive member normally engaging said auxiliary contact member and normally spaced from said main contact member, an electric heater associated with said heat responsive member and adapted to furnish heat thereto, a resistor connected in series between said auxiliary contact member and said heater, a source of current, means to normally form a stabilizing circuit from said source through said heat responsive member, said auxiliary contact member, said resistor and said heater, and means to direct actuating current through said heater independently of said auxiliary contact member and said resistor to move said heat responsive member into engagement with said main contact member.

8. The invention claimed in claim 7 including a casing enveloping said heat responsive member, said contact members and said heater.

9. In a device of the character described, in combination, a bimetallic switch member, a main contact member normally spaced from said bimetallic member, an auxiliary contact member adapted to be normally engaged by said bimetallic member, said bimetallic member being operable by cumulative heat to engage said main contact member, means controllable by said bimetallic member and said auxiliary contact member to maintain said bimetallic member normally heated to a pre-determined temperature, and means to furnish cumulative operating heat to said bimetallic member above said pre-determined temperature.

10. In a device of the character described, in combination, a bimetallic member, electric heating means in heat exchange relationship with said bimetallic member, switching means cooperative with said bimetallic member when said member is heated to a pre-determined degree, second switching means normally cooperative with said bimetallic member, a resistor in electrical series between said second switching means and said heater, and means to direct current through said heater independently of said second switching means and said resistor.

11. In a device of the character described, in combination, switching means thermally operable by electric current to control an electric circuit at a pre-determined temperature, means to supply operating current to said switching means, an auxiliary contact member normally cooperative with said switching means, and means controllable through said switching means and said auxiliary contact member to supply auxiliary heating current to said switching means whereby said switching means is normally maintained substantially at a second pre-determined temperature below said operating temperature.

12. The invention claimed in claim 11 including an air-tight casing enveloping said switching means and auxiliary contact member, and a variable resistor in said operating current supply means, said resistor being exterior to said casing and adjustable to vary said operating current.

13. In a device of the character described, in combination, a bimetallic member adapted to be heated by electric current passing therethrough, a main contact member normally spaced from said bimetallic member, an auxiliary contact member normally engageable by said bimetallic member, means to direct an operating current through said bimetallic member to heat and thereby cause said bimetallic member to flex into contact with said main contact member at a pre-determined temperature, and means controllable by said bimetallic member through said auxiliary contact member to normally direct a stabilizing current through said bimetallic member whereby said bimetallic member may normally be maintained substantially at a second pre-determined temperature below said operating temperature.

14. In a device of the character described, a thermally operable relay having a movable contact member normally biased in one direction, first and second contact members each adapted when contacted by said movable member to complete a circuit independent of the other, said movable member in its normally biased position being in electrical contact with said first contact member, heating means adjacent said movable member and adapted to heat and thereby cause said member to move out of its normally biased position and open said electrical contact with said first fixed member and assume a position between said first and second fixed members and out of contact with both of them, means for applying electric current to said heating means to maintain same at a temperature sufficient to cause said movable member to move alternately into and out of contact with said first contact member and without making contact with said second contact member, and means for causing an additional current to flow through said heating means and thereby cause said movable member to contact said second contact member.

15. The combination as claimed in claim 14 wherein the thermally operable relay comprising the fixed and movable contact members together with the heating means are enclosed in an air-tight envelope and provided with circuit connections extending through a wall thereof.

JOHN J. SHIVELY.
HARRY R. VAN DEVENTER.